United States Patent [19]
Tamura

[11] Patent Number: 6,002,886
[45] Date of Patent: *Dec. 14, 1999

[54] LENS BARREL

[75] Inventor: Masahisa Tamura, Kanagawa-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/557,380

[22] Filed: Nov. 13, 1995

Related U.S. Application Data

[63] Continuation of application No. 08/128,306, Sep. 28, 1993, abandoned.

[30] Foreign Application Priority Data

Oct. 1, 1992 [JP] Japan ..................................... 4-263625
Nov. 25, 1992 [JP] Japan ..................................... 4-315172

[51] Int. Cl.$^6$ ..................................................... G03B 3/10
[52] U.S. Cl. ............................................. 396/76; 396/72
[58] Field of Search ................................ 396/85, 86, 131, 396/137, 71, 72, 76, 83

[56] References Cited

U.S. PATENT DOCUMENTS

| | | | |
|---|---|---|---|
| 4,560,263 | 12/1985 | Katsuma et al. | 354/195.1 |
| 4,763,148 | 8/1988 | Tsukimoto et al. | 354/195.1 |
| 4,962,399 | 10/1990 | Numako et al. | 354/195.1 |
| 5,148,199 | 9/1992 | Kohomoto et al. | 396/86 |
| 5,172,149 | 12/1992 | Sekiguchi et al. | 354/195.1 |
| 5,177,524 | 1/1993 | Tahaka | 396/137 |
| 5,223,980 | 6/1993 | Hamasaki | 359/694 |
| 5,305,036 | 4/1994 | Tanaka | 396/137 |

*Primary Examiner*—Safet Metjahic
*Assistant Examiner*—Michael Dalakis
*Attorney, Agent, or Firm*—Robin, Blecker & Daley

[57] ABSTRACT

A lens barrel includes an external operation member for manual operation, a driving source, a movable lens supported movably along an optical axis, a lens moving mechanism arranged to receive a movement of the external operation member and move the movable lens at least along the optical axis and to receive a motion of the driving source and move the movable lens at least along the optical axis, and a switching mechanism for varying a ratio of the amount of the movement received from the external operation member to the amount of movement of the movable lens.

12 Claims, 11 Drawing Sheets

LENS BARREL

This is a continuation application under 37 CFR 1.62 of prior application Ser. No. 08/128,306, filed Sep. 28, 1993 now abandoned.

BACKGROUND OF THE INVENTION

1. Field of the Invention

The present invention relates to a lens barrel capable of both lens driving using a driving source and lens driving using a manual operation.

2. Description of the Related Art

Japanese Laid-open Patent Application No. Hei 2-253214 proposes a built-in focusing motor type of lens barrel which is arranged to allow a photographer to substantially serially perform an automatic focusing operation and a manual focusing operation without the need to perform a special switching operation.

The arrangement of the switching mechanism disclosed in Japanese Laid-open Patent Application No. Hei 2-253214 will be described below in brief. Although it is known that when a vibration wave motor is not driven, the rotor of the vibration wave motor is in pressure contact with the stator thereof and held by a large frictional force, the disclosed switch mechanism makes use of this nature of the vibration wave motor. The switching mechanism utilizes a differential mechanism and is arranged to enable switching between the output of the vibration wave motor and the output from a manual operation ring without the need for a special operation, thereby allowing the photographer to perform automatic focusing and manual focusing substantially in series.

Figure 11:
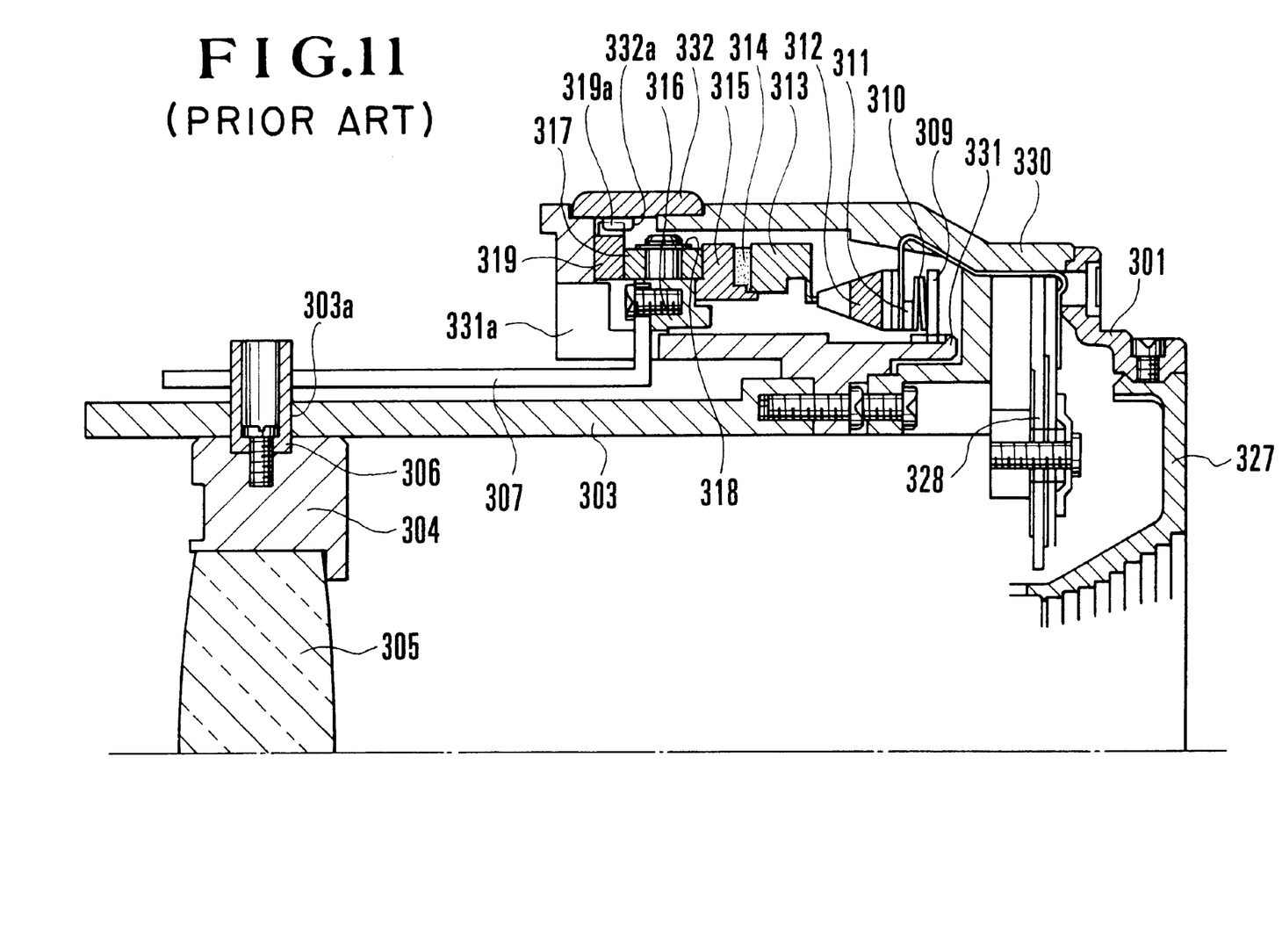
FIG. 11 is a partial cross-sectional view diagrammatically showing a lens barrel according to a related art.

FIG. 11 shows the arrangement of the switching mechanism. The arrangement shown in FIG. 11 includes a mount 301 for permitting attachment and detachment of the lens barrel to and from a camera body, a back lid 327 attached to an internal-diameter portion of the mount 301, a fixed tube 330 attached to the mount 301 and serving as a structure part connected to a guide tube 303 which supports a focusing lens 305, the fixed tube 330 further serving to form the external appearance of the lens barrel, and the guide tube 303 fixed to the fixed tube 330 and a motor unit body 331 by screws or the like. The internal peripheral portion of the guide tube 303 is maintained in sliding contact with the external peripheral portion of a focusing-lens tube 304 which holds the focusing lens 305. The guide tube 303 has a plurality of cams 303a for causing the focusing lens 305 to move forward and backward. A plurality of rollers 306 are mounted on the focusing-lens tube 304 in such a manner as to project radially from the external peripheral surface of the focusing-lens tube 304, and the external peripheral surfaces of the respective rollers 306 and the end faces of the corresponding cams 303a are held in sliding contact with each other. The motor unit body 331 is fixed to the fixed tube 330 and the guide tube 303 by screws or the like. Elements 309 to 319 are the constituent parts of a motor unit.

The shown arrangement also includes a ring-shaped stator 312 which serves as a vibrator, and a rotor 313 which is maintained in pressure contact with the stator 312. The rotor 313 rotates about the optical axis of the lens barrel by a vibration of the stator 312. The arrangement also includes a vibration absorber 311 for preventing the vibration of the stator 312 from being transmitted to the outside, a disk spring 310, a pressure adjusting ring 309, and a vibration absorber 314 for absorbing the vibration of the rotor 313. A communication ring 315 supports the rotor 313 and the vibration absorber 314 on its one end surface, and is maintained in contact with the external peripheral surfaces of at least three rollers 317 on the opposite side face. The rollers 317 are respectively supported on a roller ring 316 in such a manner as to be rotatable about axes which pass through an intersection point of the optical axis in a plane perpendicular to the optical axis. The movement of each of the rollers 317 along the rotational axis thereof is restricted by a washer 318. The internal peripheral side of the roller ring 316 is fitted onto the motor unit body 331. A manual-operation input ring 319 is supported on the motor unit body 331 in such a manner as to be rotatable about the optical axis, and is maintained in abutment with the external peripheral surfaces of the respective rollers 17.

A toothed portion 319a is formed around the external periphery of the manual-operation input ring 319, and the toothed portion 319a is meshed with a toothed portion 332a formed around the internal periphery of a manual operation ring 332 so that the manual-operation input ring 319 and the manual operation ring 332 can rotate integrally. The manual operation ring 332 is fitted onto the fixed tube 330 and the motor unit body 331 in such a manner as to be supported rotatably about the optical axis. A focusing key 307, which is fixed to the roller ring 316 at its one end, extends through an opening 331a formed in the motor unit body 331 to control the rotation of the rollers 306 about the optical axis. The lens barrel also includes an electrical circuit board 328 which executes control of a motor and other associated elements.

The operation of the above-described arrangement will be described below. However, since the operational principle of the motor is known, the description of the operation of the motor is omitted, and the following description will refer to only the operations of the essential parts of the arrangement.

When electrical power is supplied to vibrate the stator 312, the rotor 313, the vibration absorber 314 and the communication ring 315 integrally rotate about the optical axis. Then, forces are produced which cause the respective rollers 317 in contact with the communication ring 315 to rotate about their mounting axes. Since the manual-operation input ring 319 is frictionally held by a side face of the motor unit body 331, the rollers 317 roll in contact with the side face of the manual-operation input ring 319, and the roller ring 316 which rotatably supports the rollers 317 rotates about the optical axis. The amount of rotation of the roller ring 316 is selected to be ½ of the amount of rotation of the rotor 313. The amount of rotation of the roller ring 316 is transmitted to the focusing lens 305 and the focusing-lens tube 304 by the focusing key 307 via the rollers 306. The rollers 306 are engaged with the cams 303a formed in the guide tube 303, so that as the focusing key 307 rotates, the rollers 306, the focusing-lens tube 304 and the focusing lens 305 move along the optical axis while rotating about the optical axis, thereby effecting automatic focusing.

Since the internal-diameter toothed portion 332a is meshed with the external-periphery toothed portion 319a of the manual-operation input ring 319, as the manual operation ring 332 is manually rotated, the manual-operation input ring 319 is rotated about the optical axis. The rotational force of the manual-operation input ring 319 acts as a force which causes the rollers 317 to rotate about their respective rotational axes. During this time, since the communication ring 315, the rotor 313 and other associated elements are nonrotatably held by the frictional force acting between the rotor 313 and the stator 312, the roller ring 316 rotates at a rotational speed which is ½ of the rotational speed of the manual operation ring 332 as described above. The rotation of the roller ring 316 is transmitted to the focusing lens 305 via the focusing key 307, thereby effecting manual focusing.

However, in the related-art mechanism described above, during focusing, it is possible to effect only serial switching between the automatic focusing operation and the manual focusing operation, and the angle of rotation of the manual operation ring 332 and the angle of rotation of the rotor of the vibration wave motor are associated with the movement of the focusing lens 305 in the same relationship at all times. More specifically, if the manual operation ring 332 is caused to make one rotation, the roller ring 316 makes a ½ rotation to move the focusing lens 305. During automatic focusing, if the rotor of the vibration wave motor makes one rotation, the roller ring 316 similarly makes a ½ rotation to move the focusing lens 305.

In practice, if a photographer is to perform manual focusing, particularly in the case of a focusing operation which requires a large angle of rotation of the manual operation ring 332, the photographer must perform the operation of rotating the manual operation ring 332 to some extent and, after having shifted his/her hold on the lens barrel, rotating it to a further extent. As a result, the photographer cannot perform a rapid manual focusing operation, so that he/she misses a photographic opportunity.

Incidentally, a lens barrel which allows automatic focusing and manual focusing to be serially performed without a special operation is disclosed in U.S. Pat. No. 5,052,781 and U.S. patent application Ser. No. 013,331 (filed on Feb. 4, 1993).

SUMMARY OF THE INVENTION

It is, therefore, an object of the present invention to provide a lens barrel which is improved in operability.

To achieve the above object, according to one aspect of the present invention, there is provided an improved arrangement which includes a first lens moving mechanism for causing a lens to move along an optical axis thereof by a driving force produced by a driving source and a second lens moving mechanism for causing the lens to move along the optical axis by a manual operation of an operating member. In the second lens moving mechanism, a switching operation can be performed to vary the ratio of the amount of movement of the lens to a predetermined amount of operation of the operating member.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

Figure 1:
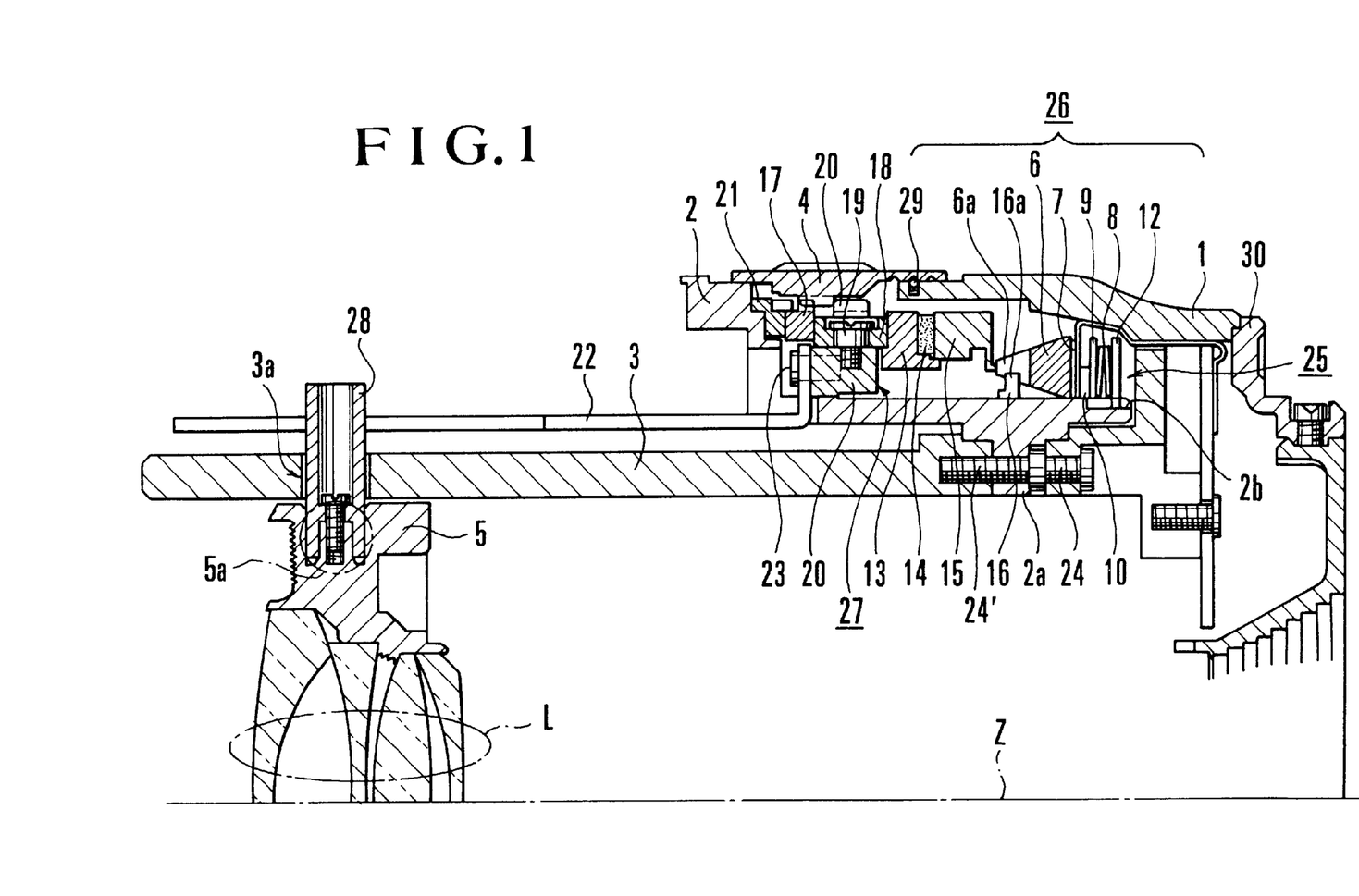
FIG. 1 is a partial cross-sectional view diagrammatically showing a first embodiment of a lens barrel according to the present invention.
Figure 2:
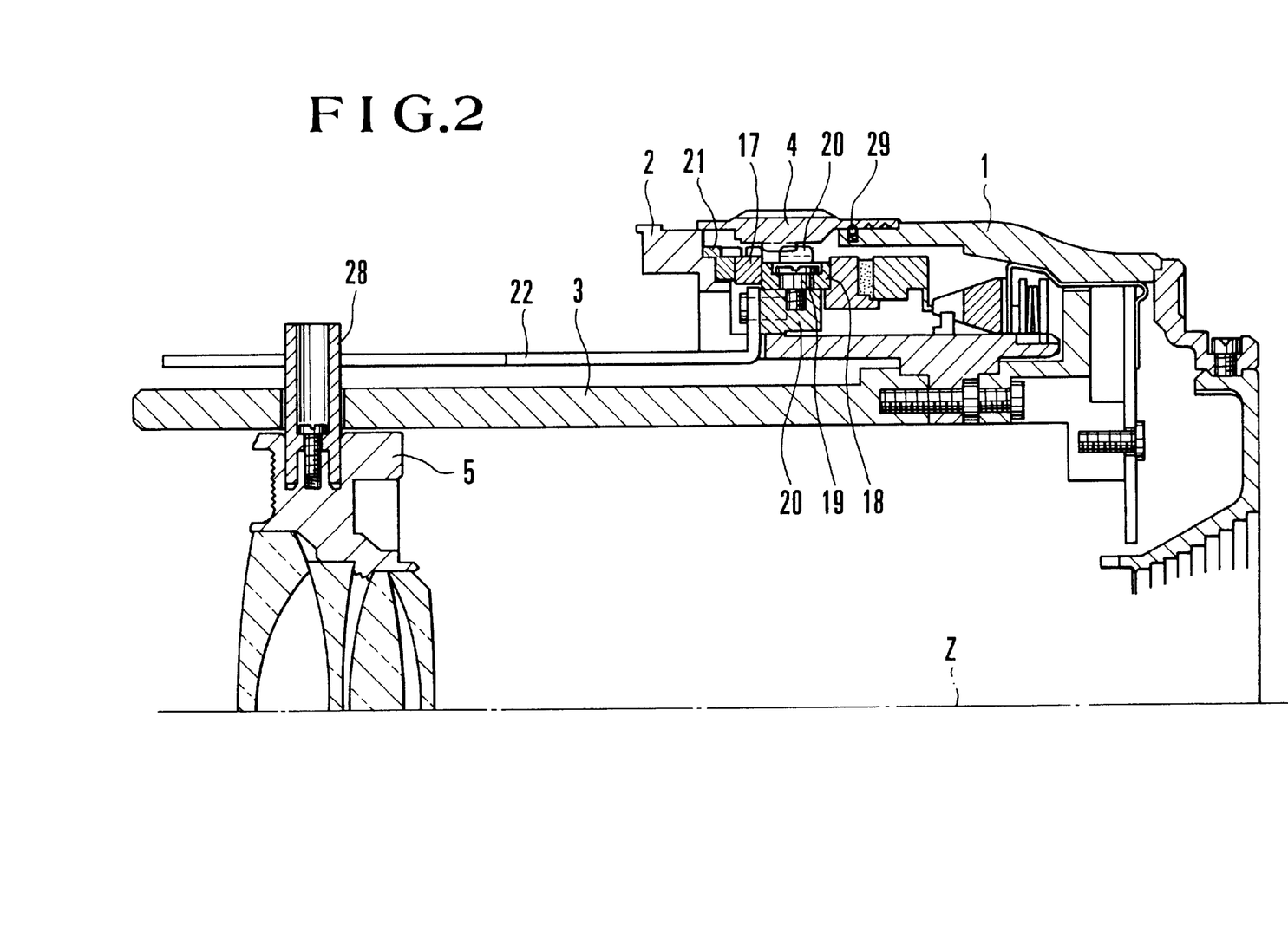
FIG. 2 is a partial cross-sectional view diagrammatically showing one switched state of the lens barrel of FIG. 1.
Figure 3:
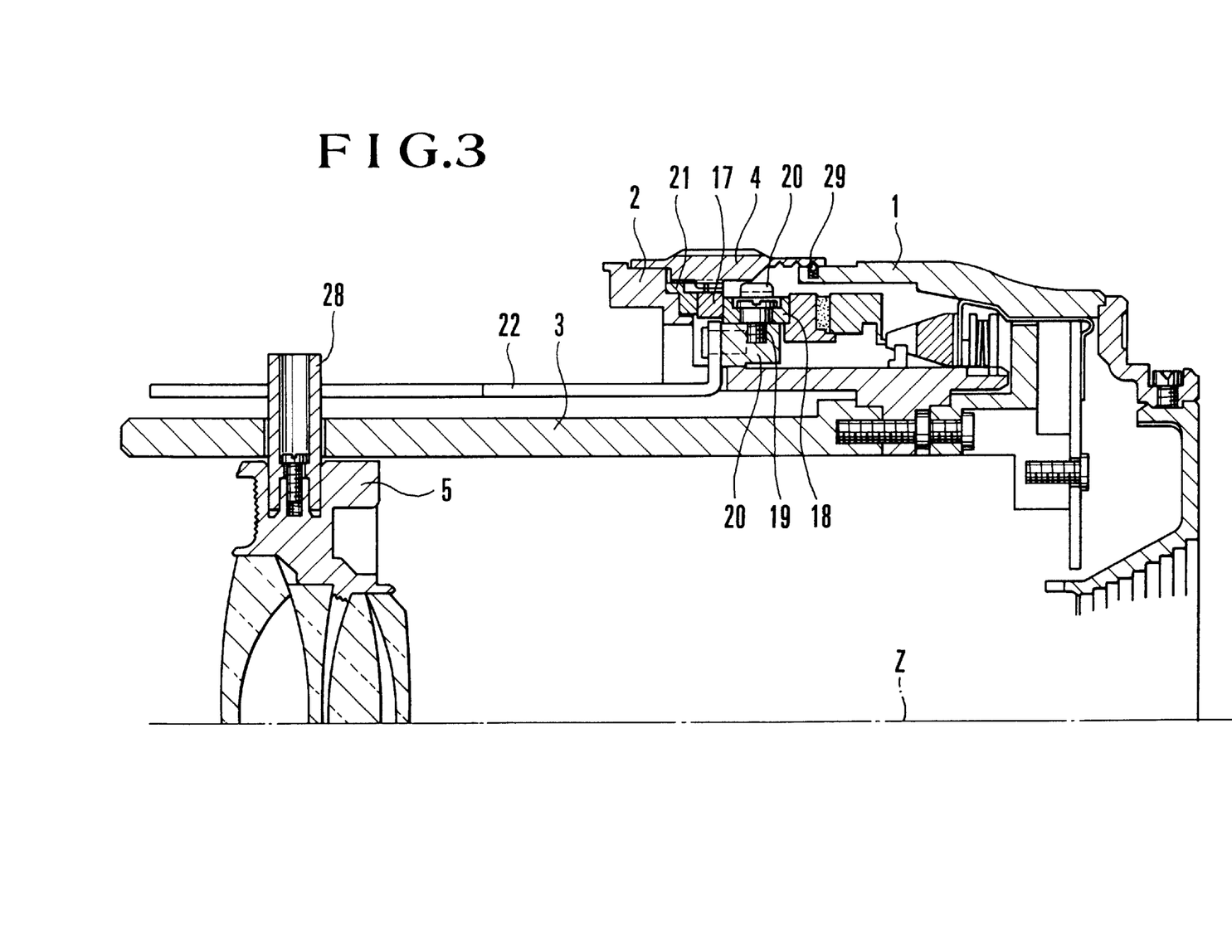
FIG. 3 is a partial cross-sectional view diagrammatically showing another switched state of the lens barrel of FIG. 1.
Figure 4:
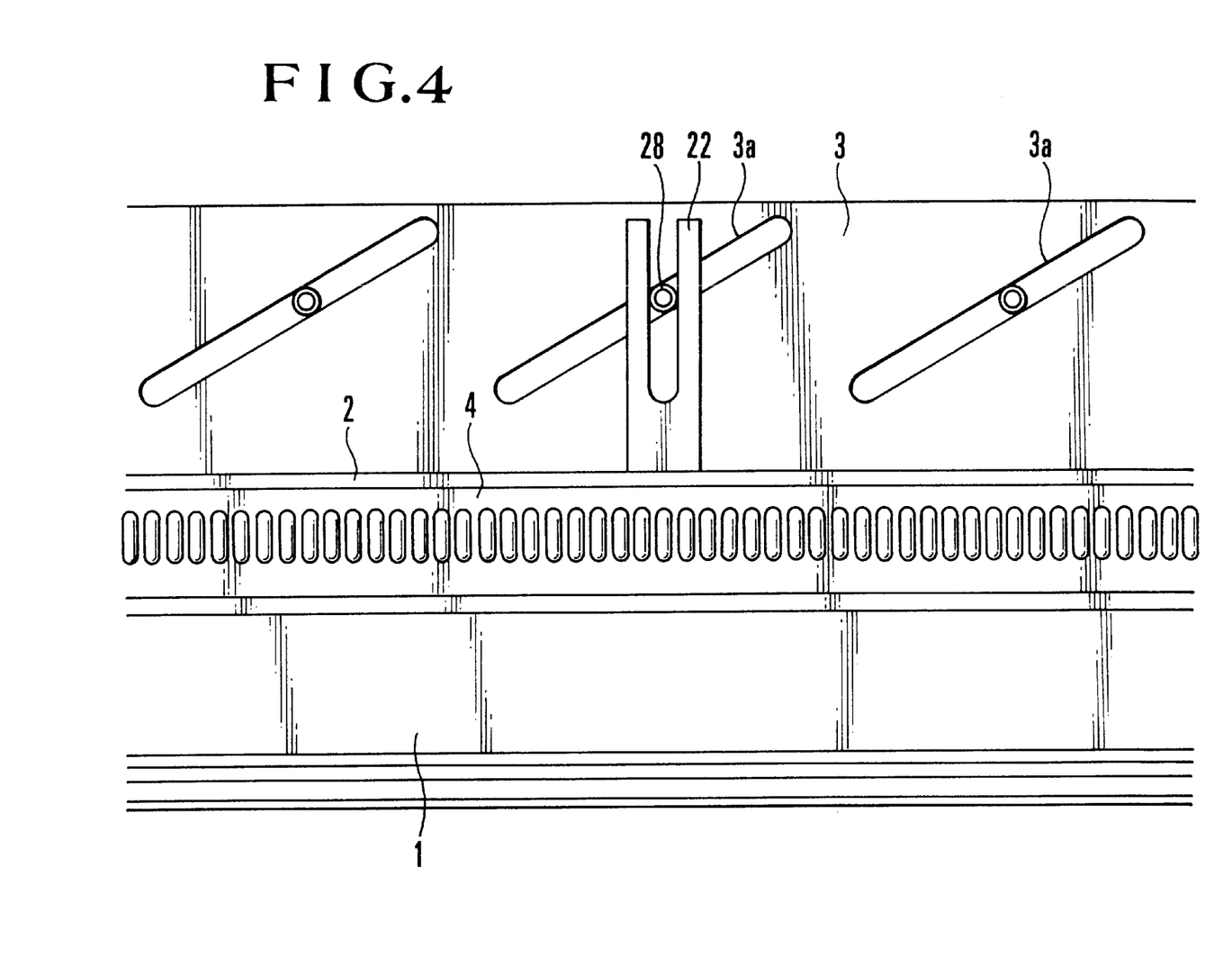
FIG. 4 is a top plan, developed view of the lens barrel of FIG. 1.

FIGS. 1 to 3 are diagrammatic cross-sectional views showing the essential portions of a first embodiment of the lens barrel according to the present invention, and show different states of the lens barrel in a switching mode. FIG. 4 is a top plan, developed view of the lens barrel of FIG. 1.

The shown lens barrel includes an external tube 1 and a fixed tube 3. The fixed tube 3 is disposed forward of the external tube 1 and has cam slots 3a for focusing purpose, and the internal-diameter portion of the fixed tube 3 is fitted on to a lens holder 5. The external-diameter portion of the lens holder 5 is fitted onto the internal peripheral portion of the fixed tube 3, and a focusing lens group L is fixed by the internal-peripheral portion of the lens holder 5. The lens holder 5 fixes at least three rollers 28 at individual portions 5a in such a manner that the rollers 28 extend radially from the optical axis of the focusing lens group L. The rollers 28 are engaged with the respective cam slots 3a, thereby positioning the lens holder 5. A manual operation ring 4 is fitted onto a circumferential groove formed around the external peripheral surface of the external tube 1 and a circumferential groove formed around the external peripheral surface of a tubular member 2, and is supported therebetween rotatably about a central axis Z (i.e., the optical axis) of the focusing lens group L and movably along the optical axis.

A tubular, driving-force generating unit 25 is inserted into the annular space between the external tube 1 and the fixed tube 3, and is fixed to the external tube 1 and the fixed tube 3 at a portion 2a of the tubular member 2 by screws 24 and 24'.

All constituent parts of a vibration wave motor 26, a motor bearing and output member 27 in contact with the rotor portion of the vibration wave motor 26, and a manual-operation input ring 17 for inputting a rotational torque of the manual operation ring 4, are disposed on the external peripheral surface of the tubular member 2. The following description refers to the constituent parts of the vibration wave motor 26, the structure of the motor bearing and output member 27 and other associated parts.

The vibration wave motor 26 includes various members such as a ring-shaped vibration member 6 having a trapezoidal cross-sectional shape, an electrostrictive element 7 physically bonded to one end surface of the ring-shaped vibration member 6, a ring-shaped vibration absorber 10 formed of felt or the like and pressure-bonded to one surface of the electrostrictive element 7, a ring-shaped spacer 9 disposed in contact with one end surface of the vibration absorber 10, a ring-shaped disk spring 8 for pressing the spacer 9 against the ring-shaped vibration member 6, a ring-shaped nut 12 screwed onto a threaded portion 2b formed around the external peripheral surface of the tubular member 2, a ring-shaped washer (not shown) inserted between the nut 12 and the disk spring 8, a rotating tube 13 which constitutes part of the rotor of the vibration wave motor 26, a rubber ring 14 for preventing an axial vibration from being transmitted to the rotating tube 13, a ring-shaped, circumferentially movable member 15, and a rotation stopping member 16 fitted onto the tubular member 2 and having a projection 16a extending around its external peripheral edge, the projection 16a being inserted in a groove 6a of the vibration member 6.

The rotating tube 13, the rubber ring 14 and the circumferentially movable member 15 integrally constitute the rotor of the vibration wave motor 26, and the rotor, which is made up of the rotating tube 13 and the rubber ring 14 as well as the circumferentially movable member 15, is made to rotate about the optical axis by a circumferential traveling-wave vibration which is produced in the ring-shaped vibration member 6.

The nut 12 is a member for adjusting the contact pressure between the vibration member 6 and the circumferentially movable member 15 by adjusting the elastic force of the disk spring 8. The nut 12 also serves as means for adjusting the contact pressure between a roller 18 which will be described later and the manual-operation input ring 17 and the contact pressure between the roller 18 and the rotating tube 13.

The motor bearing and output member 27 is disposed adjacently to the end surface of the rotating tube 13 (i.e., the rotor) of the vibration wave motor 26. The motor bearing and output member 27 includes a ring 20 which is only rotatably fitted onto the external peripheral surface of the tubular member 2, roller supporting shafts 19 which are secured at at least three locations around the circumference of the ring 20 in such a manner as to project from the external peripheral surface of the ring 20 along radial axes perpendicular to the axis Z of the ring 20 (the axis of the vibration wave motor 26), and the rollers 18 of hollow stepped form which are rotatably fitted onto the respective roller supporting shafts 19.

The ring 20 also serves as an output member of the driving-force generating unit 25, and a lens holder driving arm 22 of L-shaped cross section for rotationally driving the lens holder 5 is fastened to one end surface of the ring 20 by a screw 23.

The rollers 18 are engaged with the external peripheral surface of the rotating tube 13 to prevent the rotating tube 13 from radially fluctuating during rotation thereof. The external peripheral surface of each of the rollers 18 is in contact with the end surface of the rotating tube 13 and one end surface of the manual-operation input ring 17. The contact pressure between the rollers 18 and the rotating tube 13 is determined by the ring-shaped disk spring 8 and the ring-shaped nut 12 each of which is one constituent member of the vibration wave motor 26.

The manual-operation input ring 17 is rotatably fitted on the tubular member 2, and is in contact with the external peripheral surface of the roller 18 at its one end surface (the right-hand end surface in FIG. 1) and in contact with a friction washer 21 at the other end surface. The external-peripheral portion of the manual-operation input ring 17 has a toothed portion which are engaged with a toothed portion formed around the internal peripheral surface of the manual operation ring 4, so that the manual-operation input ring 17 can be rotated by the manual operation ring 4. The friction washer 21 is integrally fixed to the tubular member 2, and the external peripheral portion of the friction washer 21 has a toothed portion similar to that of the manual-operation input ring 17. The toothed portion of the friction washer 21 is engageable with the toothed portion formed around the internal peripheral surface of the manual operation ring 4. The manual-operation input ring 17 can rotate only when a driving torque greater than the frictional resistance between the friction washer 21 and the ring 17 is transmitted from the manual operation ring 4 to the manual-operation input ring 17. Otherwise, the manual-operation input ring 17 does not rotate.

The external peripheral surface of the ring 20 has a toothed portion similar to those of the manual-operation input ring 17 and the friction washer 21, and the toothed portion is engageable with the toothed portion formed around the internal peripheral surface of the manual operation ring 4.

The lens holder driving arm 22 is fixed to the ring 20 by the screw 23. The lens holder driving arm 22 is passed through a hole formed in a circumferential end portion of the tubular member 2 and is engaged with one of the rollers 28 which are mounted on the lens holder 5 in such a manner as to extend radially with respect to the optical axis.

Three V grooves are circumferentially formed in the internal peripheral portion of the manual operation ring 4 at the portion thereof which is fitted onto the external tube 1. A hole in which a ball 29 and a spring are accommodated is formed in the external peripheral portion of the external tube 1. The V grooves, the ball 29 and the spring cooperate to define three click positions at each of which the movement of the manual operation ring 4 along the optical axis can be stopped.

The operation of the lens barrel according to the first embodiment having the above-described structure will be described below.

First of all, reference will be made to the case in which the thrust position of the manual operation ring 4 is in the state shown in FIG. 1. If a user of the lens barrel is to drive the lens holder 5 by means of the force of the vibration wave motor 26, the user operates a focusing switch (not shown). Then, a voltage is applied to the electrostrictive element 7 by a control circuit (not shown), so that a circumferentially travelling vibration occurs in the vibration member 6 and the rotor made up of the rotating tube 13, the rubber ring 14 and the circumferentially movable member 15 is rotated about the optical axis by the vibration of the vibration member 6. The hollow rollers 18 receive a rotational torque from the rotating tube 13 by the rotation of the rotor. During this time, however, since the manual operation ring 4 is not being turned and the manual-operation input ring 17 is not rotating, the rollers 18 roll along the end surface of the manual-operation input ring 17 while rotating about the respective roller supporting shafts 19, whereby the ring 20 is rotated about the optical axis Z via the roller supporting shafts 19. Thus, since the lens holder driving arm 22 is turned about the optical axis Z together with the ring 20, the lens holder 5 is rotated about the optical axis Z and simultaneously moves along the optical axis, thereby effecting automatic focusing.

If the user of the lens barrel is to drive the lens holder 5 not by the force of the vibration wave motor 26 but by the force of the fingers or hand, the user turns the manual operation ring 4 about the optical axis Z by the fingers without operating the focusing switch. Then, the manual-operation input ring 17 is rotated about the optical axis Z against the frictional resistance with the friction washer 21. During this time, however, since the vibration wave motor 26 is not being driven and the rotating tube 13 which constitutes the rotor of the vibration wave motor 26 is stationary, the rollers 18 roll on the end face of the rotating tube 13 while being rotated by the manual-operation input ring 17. Thus, the ring 20 is rotated about the optical axis Z via the roller supporting shafts 19, and the lens holder 5 moves along the optical axis Z while being rotated by the lens holder driving arm 22, thereby effecting manual focusing.

In the first embodiment, the rotational ratio of the rotating tube 13 to the ring 20 and the rotational ratio of the manual-operation input ring 17 to the ring 20 are designed to be 2:1, respectively.

Referring to the state shown in FIG. 2, the manual operation ring 4 is moved to the right-hand side as viewed in FIG. 1. The toothed portion formed around the internal periphery of the manual operation ring 4 is disengaged from the external peripheral portion of the manual-operation input ring 17 and is brought into engagement with the toothed portion formed around the external peripheral portion of the ring 20. At this position, the manual operation ring 4 is click-stopped and is substantially secured with respect to the direction of the optical axis.

If the manual operation ring 4 is turned about the optical axis in this state, the ring 20 rotates together with the manual operation ring 4 by its engagement with the toothed portion formed around the internal periphery of the manual operation ring 4. Accordingly, the lens holder driving arm 22 fixed to the ring 20 rotates similarly, whereby the lens holder 5 is moved forward or backward along the optical axis while being turned via the rollers 28.

In this case, the rotational ratio of the manual operation ring 4 to the ring 20 is selected to be 1:1, and the amount of rotation of the ring 20 caused by the turning of the manual operation ring 4 can be varied compared to the state shown in FIG. 1.

Referring to the state shown in FIG. 3, the manual operation ring 4 is moved from the state of FIG. 1 to the left-hand side as viewed in FIG. 3. The toothed portion formed around the internal periphery of the manual operation ring 4 is, while being engaged with the toothed portion formed around the external peripheral portion of the manual-operation input ring 17, brought into engagement with the toothed portion formed around the external peripheral portion of the friction washer 21. At this position, the manual operation ring 4 is click-stopped and is substantially secured with respect to the direction of the optical axis.

In this state, the manual operation ring 4 is secured with respect to the direction of rotation about the optical axis together with the friction washer 21, since the friction washer 21 is secured to the tubular member 2. During this time, since driving for automatic focusing using the vibration wave motor is possible, a mode for executing only automatic focusing is selected. Accordingly, it is possible to prevent a disturbance from being applied from the outside of the lens barrel through the manual operation ring 4, whereby accidental defocusing is prevented.

As is apparent from the above description, the lens barrel according to the first embodiment can realize the following operations.

(1) Manual focusing can be serially performed immediately after automatic focusing.

(2) Manual focusing can be performed at a speed which differs from that of the manual focusing performed in operation (1) (in the first embodiment, a double speed).

(3) By locking the manual operation ring 4 to enable only automatic focusing, it is possible to prevent accidental defocusing due to a disturbance applied from the outside of the lens barrel.

Since switching operations (1) to (3) can be performed merely by moving the manual operation ring 4 along the optical axis, an operator needs only to hold only the manual operation ring 4 during any of the operations (1) to (3) so that it is possible to smoothly perform the individual switching operations as well as manual focusing.

Figure 5:
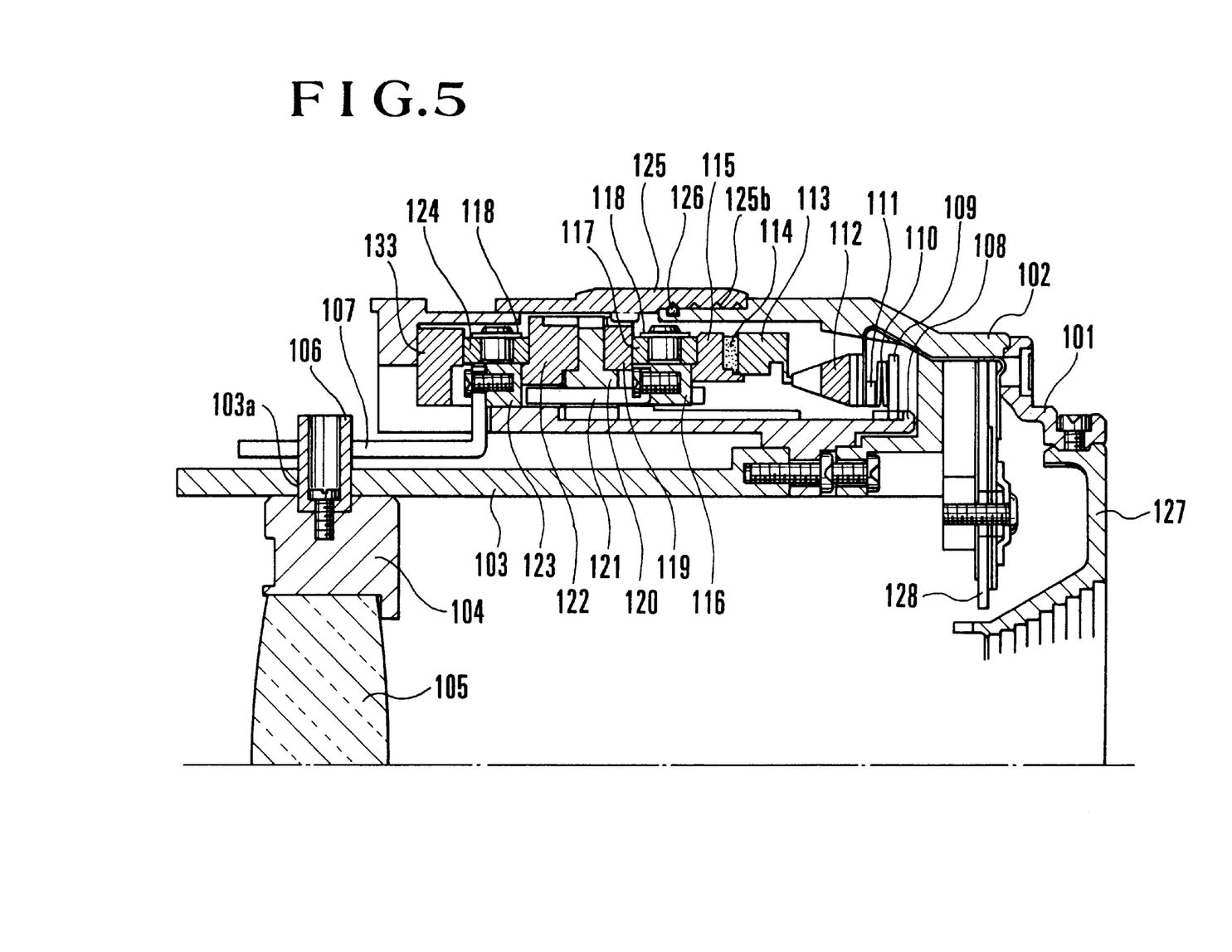
FIG. 5 is a partial cross-sectional view diagrammatically showing a second embodiment of the lens barrel according to the present invention, and shows a first state thereof.
Figure 6:
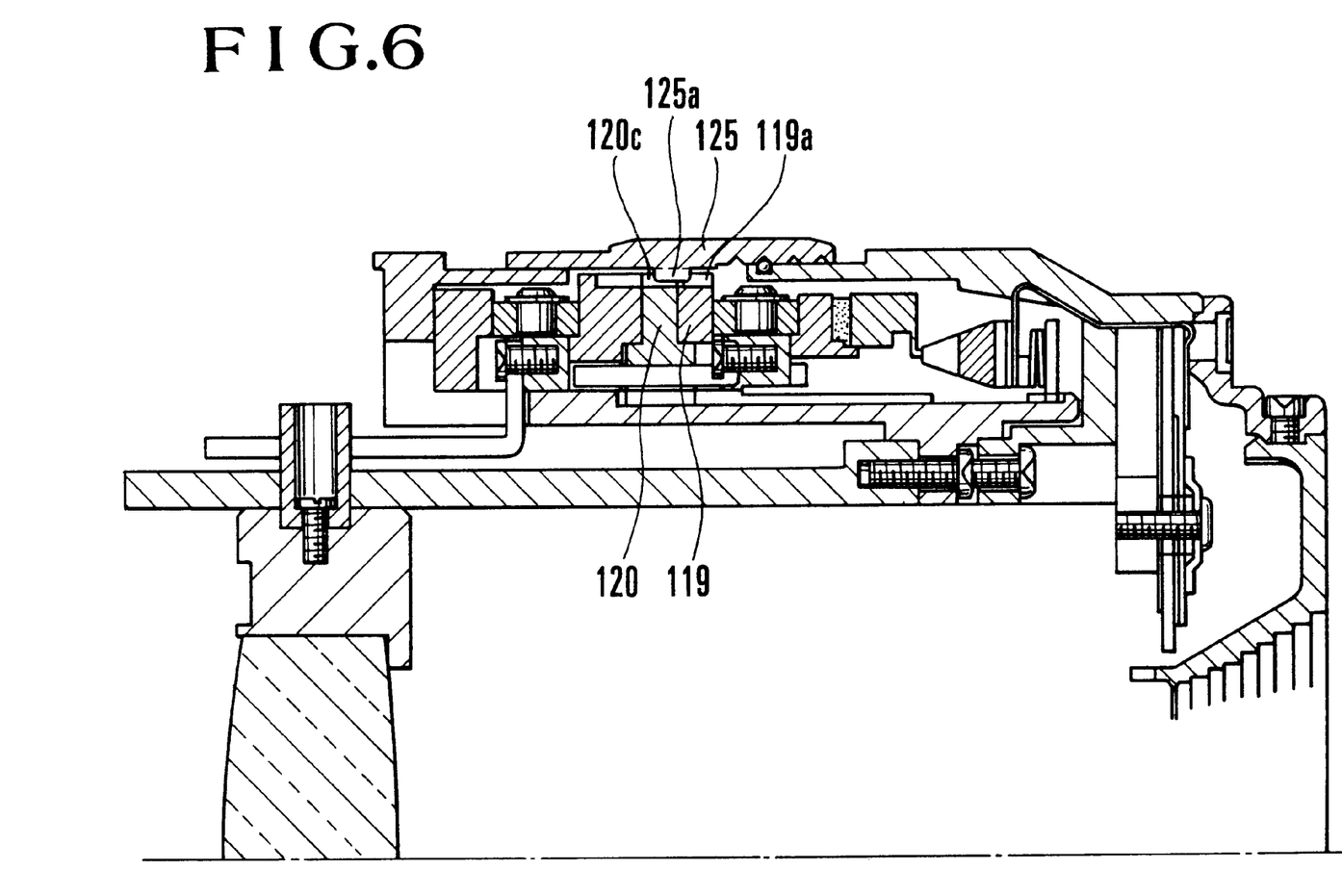
FIG. 6 is a partial cross-sectional view diagrammatically showing a second state of the second embodiment of the lens barrel according to the present invention.
Figure 7:
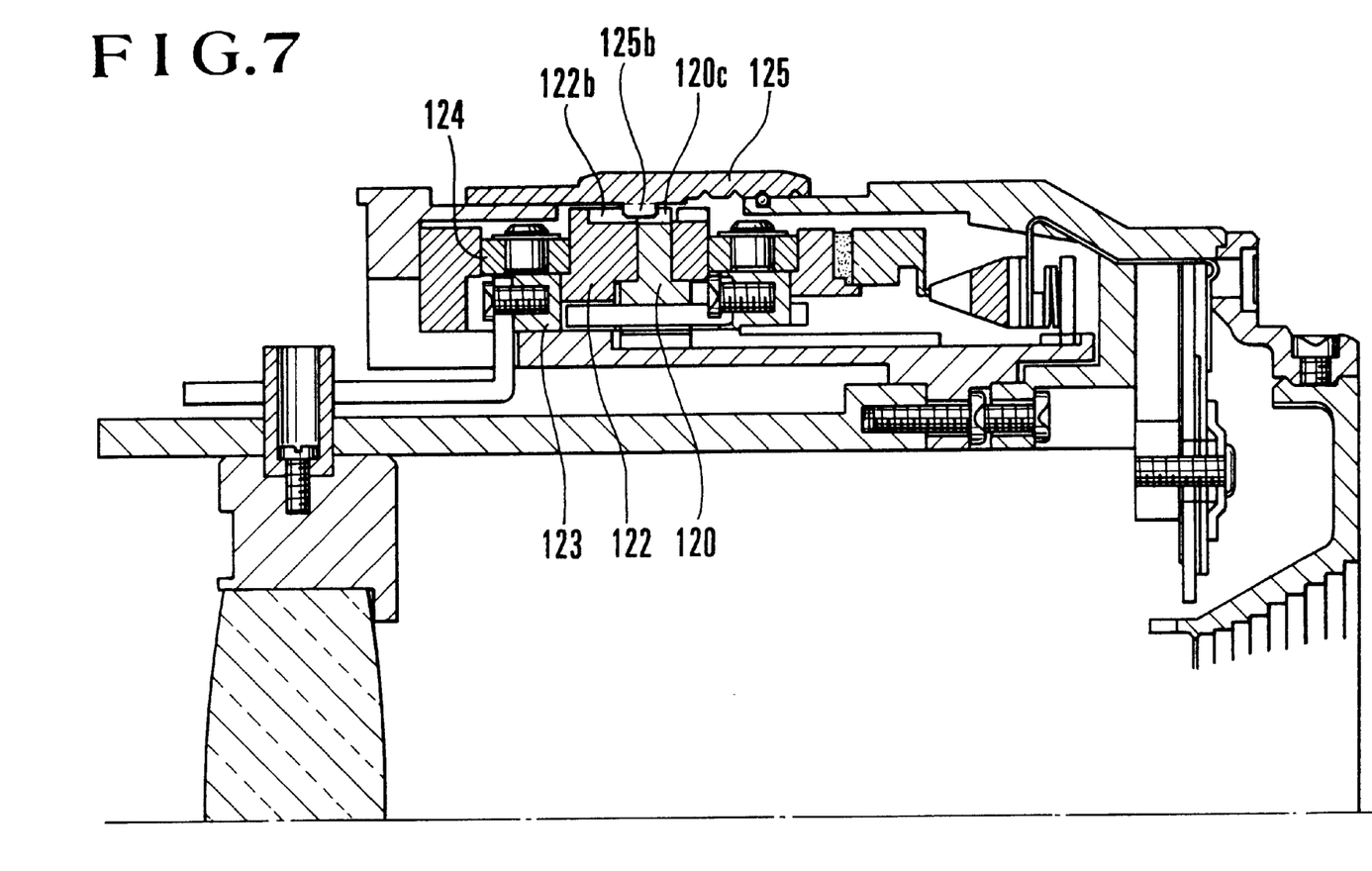
FIG. 7 is a partial cross-sectional view diagrammatically showing a third state of the second embodiment of the lens barrel according to the present invention.
Figure 8:
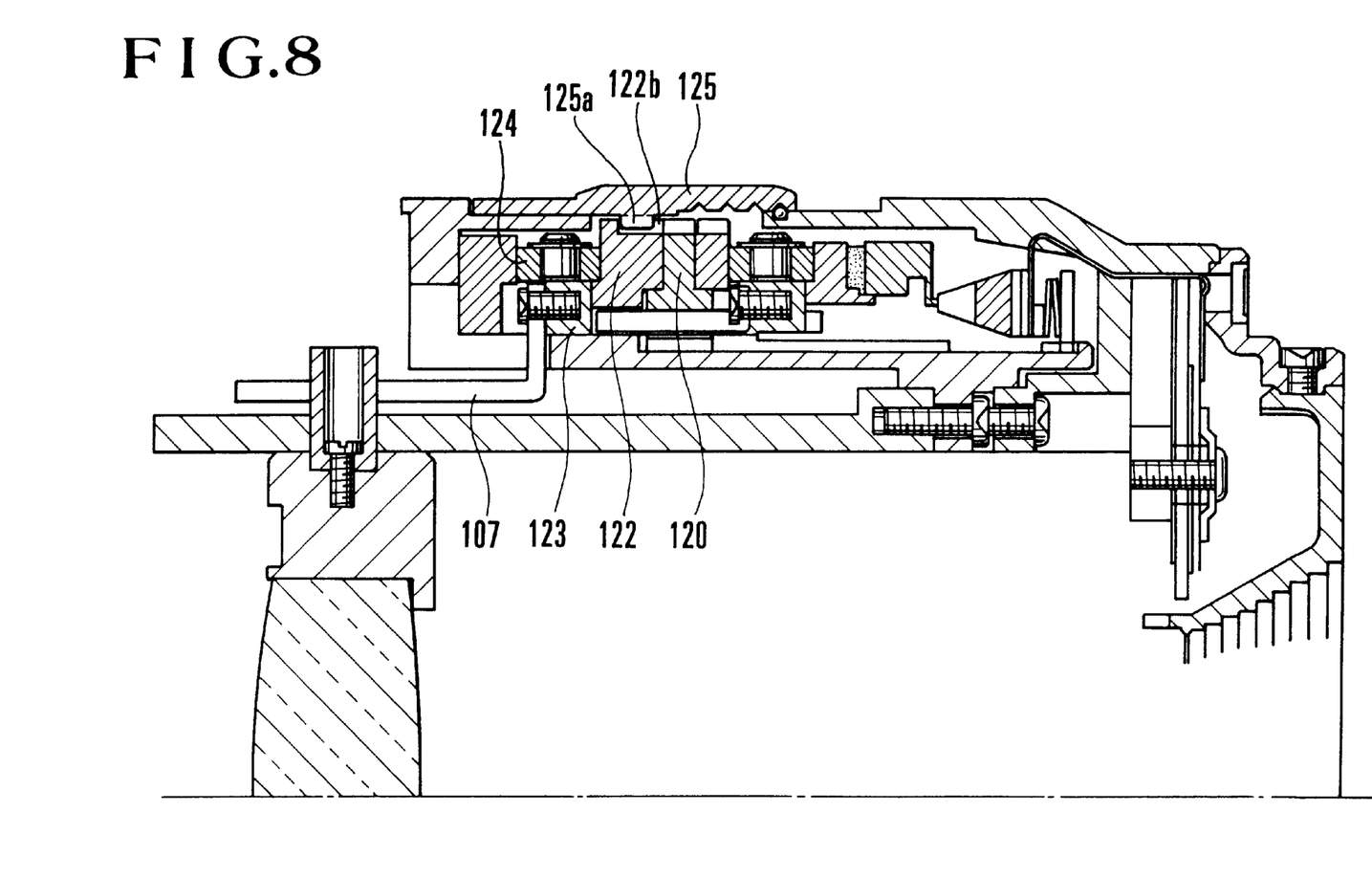
FIG. 8 is a partial cross-sectional view diagrammatically showing a fourth state of the second embodiment of the lens barrel according to the present invention.
Figure 9:
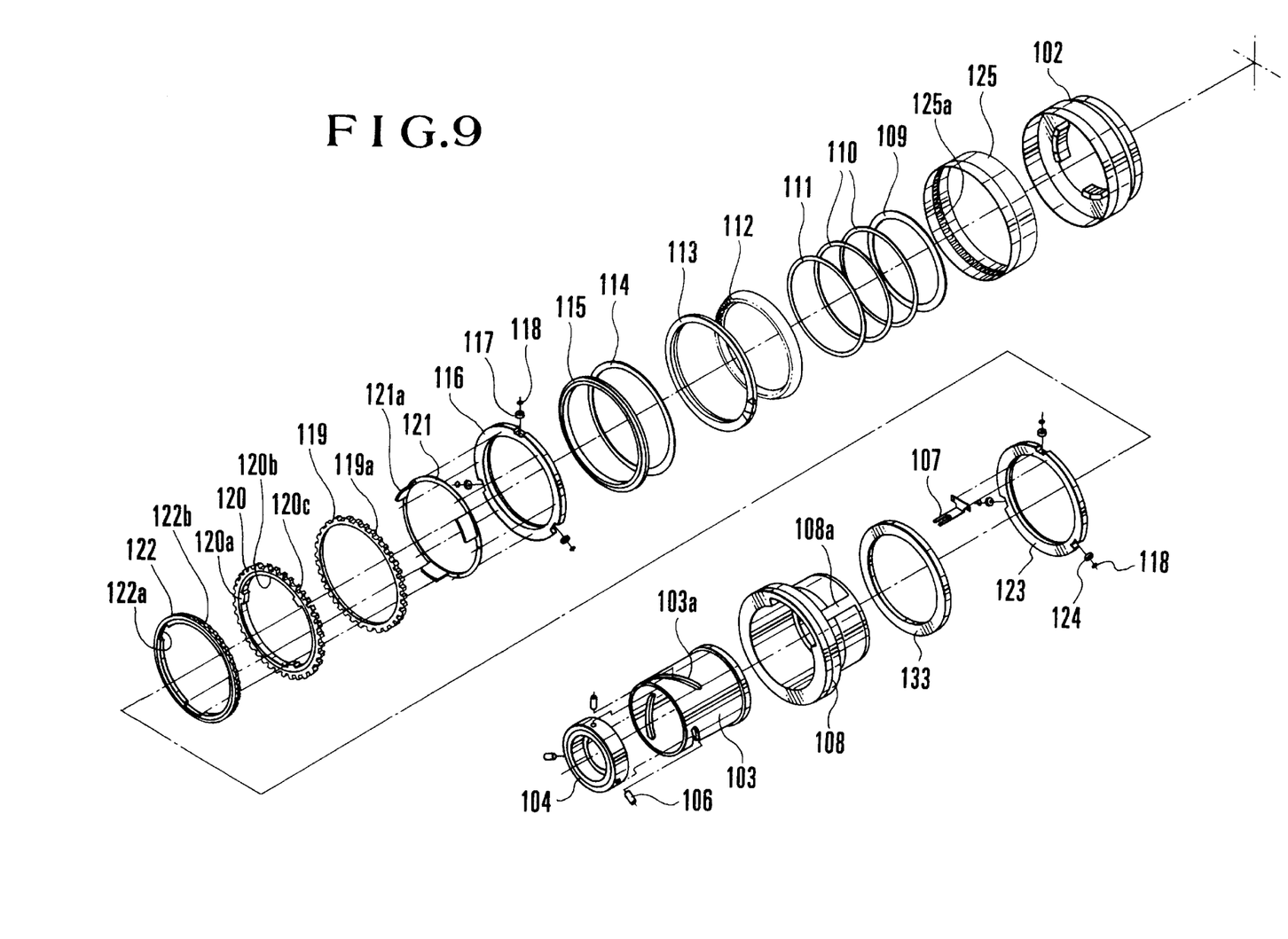
FIG. 9 is an exploded, perspective view of the second embodiment of the lens barrel according to the present invention.

FIG. 5 shows a second embodiment of the lens barrel according to the present invention, and FIGS. 6, 7 and 8 are views showing different switched states of the manual operation ring. FIG. 9 is an exploded, perspective view of the lens barrel of FIG. 5.

The lens barrel shown in FIG. 5 includes a mount 101 for detachably attaching the lens barrel to a camera body, a fixed tube 102 for coupling the mount 101 and a guide tube 103 together, and the guide tube 103 which is fixedly supported on the fixed tube 102 and a motor unit body 108 by a screw or the like and whose internal-diameter side is fittedly supporting a focusing lens tube 104 which holds a focusing lens 105. The guide tube 103 has focusing cams 103a, and the end surfaces of the respective focusing cams 103a are engaged with the external peripheral surfaces of corresponding rollers 106 which are mounted to extend radially from the focusing lens tube 104. The output from a motor part is provided through the rotation of a focusing key 107 about the optical axis of the focusing lens 105. However, since the corresponding one of the rollers 106 is supported movably along the optical axis by the focusing key 107, the rotation of the focusing key 107 is converted into a movement parallel to the optical axis by the focusing cams 103a. Thus, the focusing lens 105 and the focusing lens tube 104 are moved along the optical axis while rotating about the optical axis, thereby effecting focusing.

The internal arrangement of a motor unit will be described below. The motor unit body 108 provides support for parts 109 to 123 and 133 which will be described later, and is fixed to the guide tube 103 and the fixed tube 102 by screws or the like. Since the parts 109 to 119 are similar to the corresponding parts used in the related-art example shown in FIG. 11, description thereof is omitted.

As shown in FIG. 9, the fixed ring 120 has a plurality of projections 120a spaced apart around its internal peripheral surface, and the projections 120a are engaged with corresponding grooves 108a formed around the external periphery of the motor unit body 108, thereby limiting the fixed ring 120 nonrotatably. The external peripheral portion of the fixed ring 120 has a toothed portion 120c similar to that of a manual-operation input ring 119 (hereinafter referred to as the first manual-operation input ring). The toothed portion 120c is engageable with a toothed portion 125a formed around the internal-diameter portion of a manual operation ring 125.

A connecting key 121 is fixed to a roller ring 116 (hereinafter referred to as the first roller ring), and three nail portions 121a extend from the connecting key 121 along the optical axis. A second manual-operation input ring 122 abuts against the fixed ring 120 along the optical axis and is supported rotatably about the optical axis. The external peripheral portion of the second manual-operation input ring 122 has a toothed portion 122b similar to that of the fixed ring 120 and recesses 122a spaced apart around its internal peripheral portion. The nail portions 121a of the connecting key 121 are engaged with the corresponding recesses 122a through internal peripheral grooves 120b of the fixed ring 120, respectively. Accordingly, the first roller ring 116, the connecting key 121 and the second manual-operation input ring 122 are supported integrally rotatably about the optical axis.

Rollers 124 abut against the second manual-operation input ring 122 on its external peripheral surface, and the rollers 124 are radially supported by a second roller ring 123 and can be rotated about their respective axes by the second manual-operation input ring 122. The second roller ring 123 is diametrically fitted onto the motor unit body 108 and is rotatable about the optical axis. The focusing key 107 is fixed to the second roller ring 123, and the focusing lens 105 is made to move forward and backward by the focusing key 107 which serves as a motor output. A spacer 133 is fixed to the motor unit body 108 and abuts against the external peripheral surfaces of the respective rollers 124.

In the above-described arrangement, a communication ring 115 and rollers 117, the rollers 117 and the manual-operation input ring 119, the manual-operation input ring 119 and the fixed ring 120, the fixed ring 120 and the second manual-operation input ring 122, the second manual-operation input ring 122 and the second rollers 124, and the second rollers 124 and the spacer 133 are respectively held in abutment with each other by appropriate frictional forces produced by the pressure of a disk spring 110.

A manual operation ring 125 is supported rotatably about the optical axis by the fixed tube 102 and the motor unit body 108, and is also supported movably along the optical axis in a stepped manner by V grooves 125b and a click ball 126 or the like. The lens barrel also includes a back lid 127 and an electrical circuit 128 for supplying electrical power to and executing control of the vibration wave motor.

The operation of the second embodiment will be described below with reference to FIGS. 5 through 9. FIG. 5 shows the case of motor driving. In this case, a rotor 113 rotates and, at the same time, a vibration absorber 114 and the communication ring 115 rotate. The first rollers 117 which abut against the communication ring 115 rotate about their respective rotational axes, and on the principle of a differential mechanism, the first roller ring 116 rotates at a speed which is ½ of that of the rotor 113. The rotational force of the first roller ring 116 is converted into the rotational force of the second manual-operation input ring 122 about the optical axis through the connecting key 121. The focusing key 107 fixed to the second roller ring 123 provides a rotational output which is ½ of the amount of rotation of the first roller ring 116, i.e., ¼ of the amount of rotation of the rotor 113, owing to the differential mechanism formed by the second rollers 124 and the second roller ring 123 which abut against the second manual-operation input ring 122.

If manual focusing is executed by rotating the manual operation ring 125 with the toothed portion 125a being engaged with a toothed portion 119a of the manual-operation input ring 119 as shown in FIG. 5, the manual operation ring 125 and the manual-operation input ring 119 rotate integrally, and the first roller ring 116 rotates at a speed which is ½ of the rotational speed of the manual operation ring 125, owing to the differential mechanism formed by the first rollers 117 and the first roller ring 116. Accordingly, the focusing key 107 rotates at a speed which is ¼ of the rotational speed of the manual operation ring 125 (this state is hereinafter referred to as the first state).

Then, if the manual operation ring 125 is shifted by one click from the first state of FIG. 5 in the forward direction along the optical axis (this state is hereinafter referred to as the second state), the toothed portion 125a around the internal peripheral portion of the manual operation ring 125 integrally meshes with both the toothed portion 119a formed around the external peripheral portion of the manual-operation input ring 119 and the toothed portion 120c formed around the external peripheral portion of the fixed ring 120. If motor driving is performed during this state, an output corresponding to a ¼ rotation can be obtained similarly to the state shown in FIG. 5. However, since the manual operation ring 125 is integrally meshed with the fixed ring 120 which is nonrotatable, no manual focusing is possible and only motor driving is enabled.

FIG. 7 shows the state in which the manual operation ring 125 is shifted by one click from the second state of FIG. 6 in the forward direction along the optical axis (this state is hereinafter referred to as the third state). In the third state, the toothed portion 125a around the internal peripheral portion of the manual operation ring 125, the toothed portion 120c around the external peripheral portion of the fixed ring 120 and the toothed portion 122b around the external peripheral portion of the second manual-operation input ring 122 are integrally meshed with each other. Similarly to the second state, manual focusing is impossible since the rotation of the manual operation ring 125 is inhibited. Further, motor driving is impossible since the rotation of the second manual-operation input ring 122 is inhibited so that no output is transmitted to the second rollers 124 and the second roller ring 123.

FIG. 8 shows the state in which the manual operation ring 125 is shifted by one click from the third state of FIG. 7 in the forward direction along the optical axis (this state is hereinafter referred to as the fourth state). The toothed portion 125a around the internal peripheral portion of the manual operation ring 125 is meshed with the toothed portion 122b around the external peripheral portion of the second manual-operation input ring 122. Accordingly, although motor driving provides an output corresponding to a ¼ rotation similarly to the first state, the manual operation ring 125 rotates at a speed which is ½ of the rotational speed of the vibration wave motor. If the manual operation ring 125 is manually rotated, the second manual-operation input ring 122 meshed therewith rotates at the same time, so that the focusing key 107 which serves as the motor output can be rotated about the optical axis at a speed which is ½ of the rotational speed of the manual operation ring 125, owing to the differential mechanism formed by the rollers 124 and the second roller ring 123.

The respective operations described above in connection with the first to fourth states are summarized in Table 1, and the features of the respective states will be described below.

First State . . . Automatic focusing with motor driving is possible. Since a large speed reduction ratio can be achieved compared to the related-art arrangement, a focusing lens of larger weight can be driven. It is possible to perform manual focusing immediately after automatic focusing without a switching operation, and finer adjustment is facilitated since a large speed reduction ratio can be achieved since the speed reduction ratio is doubled compared to the related-art arrangement.

Second State . . . Automatic focusing with motor driving is possible. The manual operation ring is secured so that even if a finger or the like of an operator comes into contact with the manual operation ring during photography, defocusing does not occur.

Third State . . . Neither automatic focusing nor manual focusing is possible. Since the focusing lens does not move, "prefocusing photography" can be performed.

Fourth State . . . Automatic focusing with motor driving is possible, but since the manual operation ring also rotates, the operation corresponding to this state is seldom used. Since the focusing lens is moved at a speed which is two times that used in the first state, rapid manual focusing is possible.

Although the second embodiment utilizes the two-step differential mechanism, it is of course possible to use a differential mechanism of three, four or more steps.

TABLE 1

| State | First | Second | Third | Fourth |
|---|---|---|---|---|
| Motor Driving | 1/4 | 1/4 | Locked | 1/4 |
| Manual Focusing | 1/4 | Locked | Locked | 1/2 |
| Operational State | Use of Both Motor Driving and Manual Focusing | Use of Only Motor Driving | Inhibition of Movement of Focusing Lens (Prefocusing) | Coarse Operation of Manual Focusing |

Figure 10:
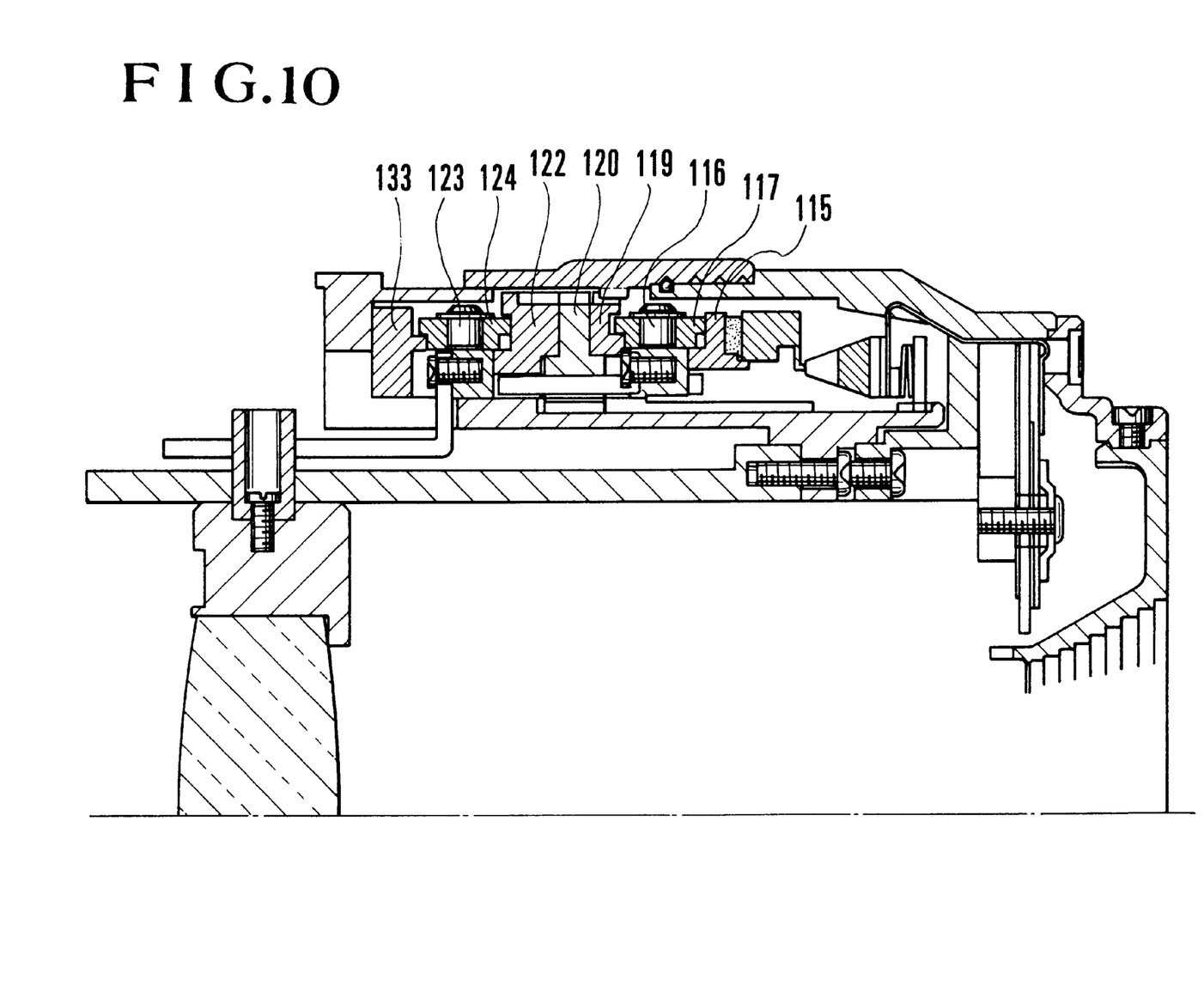
FIG. 10 is a partial cross-sectional view diagrammatically showing a third embodiment of the lens barrel according to the present invention.

FIG. 10 shows a third embodiment of the lens barrel according to the present invention.

In the third embodiment, stepped rollers are used as the rollers 117 and 124 of the second embodiment shown in FIG. 5. The different-diameter portions of each of the rollers 117 abut against the communication ring 115 and the manual-operation input ring 119, respectively, while the different-diameter portions of each of the rollers 124 abut against the second manual-operation input ring 122 and the spacer 133 which adjoin the rollers 124, respectively. If an output from the motor is inputted to a large-diameter portion $R_1$, the relationship between the amount of rotation of the roller ring 116 which supports the stepped rollers 117 and the amount of rotation of the motor is represented as follows:

(Amount of rotation of roller ring)/(amount of rotation of motor)= $R_2/(R_1+R_2)$ (Amount of rotation of roller ring)/(amount of rotation of manual operation ring)=$R_1/(R_1+R_2)$ where $R_1$ represents the diameter of the large-diameter portion of each of the stepped rollers and $R_2$ represents the diameter of the small-diameter portion of each of the stepped rollers.

Accordingly, it is possible to provide various speed reduction ratios by variously selecting the shape of the stepped roller or the state of abutment of peripheral parts, whereby the freedom of design can be enlarged. The rollers 117 and rollers 124 may differ from each other in shape. Accordingly, if the rollers 117 and the rollers 124 of different shapes are used, the freedom of design is further enlarged so that an optimum speed reduction ratio can be designed.

As is apparent from the above description, according to the second and third embodiments, two or more differential mechanisms each made up of, for example, rollers and a roller ring are connected so that it is possible to vary the speed reduction ratio of the amount of rotation of a moving-lens driving member, such as a focusing key, to the motor output and the amount of rotation of a manual operation ring which serves as a manual operating member. Accordingly, it is possible to make the speed reduction ratio larger than that of the related art, whereby fine adjustment is also possible.

Further, it is possible to selectively set various kinds of states by moving the manual operation ring along the optical axis in a stepped manner. Even if a finger or the like of an operator comes into contact with the manual operation ring during photography, defocusing does not occur. It is also possible to realize various switching operations such as the operation of inhibiting automatic focusing and the operation of varying the ratio of the amount of forward movement of a lens to the amount of rotation of the manual operation ring. Accordingly, since it is possible to flexibly adjust the operational response of the lens barrel to various photographic statuses, the operability thereof can be improved compared to the related-art arrangement.

By providing a stepped roller in a differential mechanism, it is possible to arbitrarily select and design the amount of the output rotation of the focusing key with respect to the motor output and the input of the manual operation ring.

What is claimed is:

1. A lens barrel, comprising:
   a) a movable lens,
   b) a first member which, by rotation, moves said movable lens,
   c) a second member mechanically connected to said first member, which, by rotation, rotates said first member, and
   d) an external operation member, capable of rotating around an optical axis and capable of sliding in an optical axis direction by manual operation of a user,
   wherein said external operation member is changed over, when slided by the manual operation of the user, between a state to connect with said first member and a state to connect with said second member, and when the external operating member connects with said first member, manual force to rotate said external operation member is transmitted in the order of said first member and then said movable lens, and when said external operation member connects with said second member, the manual force is transmitted in the order of said external operation member, said second member, said first member then said movable lens.

2. A lens barrel according to claim 1, further comprising a roller having a rotation center on said first member, wherein said first member rotates with the rotation of said roller.

3. A lens barrel according to claim 2, wherein said second member engages with said roller which rotates when said second member rotates.

4. A lens barrel according to claim 2, further comprising a motor for driving said movable lens wherein said motor rotates said roller.

5. A lens barrel according to claim 4, wherein said motor is a vibration wave motor.

6. A lens barrel according to claim 5, wherein said vibration wave motor has a rotor contactable with said roller.

7. A lens barrel according to claim 1, further comprising a fixing portion for locking the rotation of said external operation member, wherein said external operation member is connected with said fixing portion by movement of said external operation member in an optical axis direction of said movable lens.

8. A lens barrel comprising:
   a) a movable lens,
   b) a first member which, by rotation, moves said movable lens,
   c) a rotatory member which rotates on said first member, wherein said first member rotates with the rotation of said rotatory member,
   d) a second member mechanically connected to said rotary member, which, by rotation, rotates said rotatory member, and e) an external operation member, capable of rotating around an optical axis and capable of sliding in an optical axis direction by manual operation of a user, wherein said external operation member is changed over, when slided by the manual operation of the user, between state to connect with said first member and a state to connect with said second member, and when the external operation member connects with said first member, manual force to rotate said external operation member is transmitted in the order of said first member and then the said movable lens, and when said external operation member connect with said second member, the manual force is transmitted in the order of said external operation member, said second member, said first member and then said movable lens.

9. A lens barrel according to claim 8, further comprising a motor for driving said movable lens, said motor rotating said rotatory member.

10. A lens barrel according to claim 9, wherein said motor is a vibration wave motor.

11. A lens barrel according to claim 10, wherein said vibration wave motor has a rotor connectable to said rotatory member.

12. A lens barrel according to claim 8, further comprising a fixing portion for locking the rotation of said external operation member, wherein said external operation member is connected to said fixing portion by movement of said external operation member in the optical axis direction of said movable lens.

* * * * *